United States Patent [19]
Tsai et al.

[11] Patent Number: 6,128,372
[45] Date of Patent: Oct. 3, 2000

[54] EXTENSION DEVICE FOR TELEPHONE

[75] Inventors: Hong-Chang Tsai, Taipei, Taiwan; Yong Pan; Yifeng Qian, both of Nang-King, China; Zhen-Xing Lai, Taipei, Taiwan

[73] Assignee: Inventec Corp., Taipei, Taiwan

[21] Appl. No.: 09/185,438

[22] Filed: Nov. 2, 1998

[51] Int. Cl.[7] .................................................. H04M 11/00
[52] U.S. Cl. .............................. 379/90.01; 379/110.01; 379/387
[58] Field of Search ............................... 379/110.01, 387, 379/90.01; 455/556, 557

[56] References Cited

U.S. PATENT DOCUMENTS

5,604,870  2/1997  Moss et al. ........................... 395/280
5,835,732  11/1998 Kikinis et al. ......................... 455/556

Primary Examiner—Curtis A. Kuntz
Assistant Examiner—Melur Ramakrishnaiah
Attorney, Agent, or Firm—W. Wayne Liauh

[57] ABSTRACT

The present invention provides an extension device capable of working with a common digital telephone and providing functions of easy text input, data carrying, exchange, storage and editing. The telephone extension device includes a data exchange unit which communicates directly with a digital telephone; an electric note card (similar to a Personal Digital Assistant, PDA) which includes a display unit for showing information, and a standard computer keyboard for easy and fast character input when connecting via the data exchange unit to the digital telephone. Therefore, the extension device for digital telephone is easy for data input, easy to operate and carry, and useful for recording telephone information.

9 Claims, 10 Drawing Sheets

EXTENSION DEVICE FOR TELEPHONE

BACKGROUND OF THE INVENTION

The present invention relates to an extension device for telephone, more particularly to a device capable of connecting to a digital telephone to achieve data exchange, storage and editing, and providing other functions of easy input and convenient carrying-around.

Telephones have been an important communication media of the modem life. Some telephone networks already provide the functions of combining caller's phone number into transmission for the answerer to receive it via a certain detector, or even to store it for reference or further to use it for automatic dialing. These have significantly increased the convenience of telephone use. But people may still be unsatisfied with these relatively simple functions of provided by a traditional digital telephone which are limited to answering, calling, electric notebook for recording phone numbers and names, and reviewing incoming messages only.

To summarize the convenience of telephone use, it is practical for number input since the keyboard of traditional telephone is of CCITT standard keyboard, but very inconvenient and slow for text input (such as for a person's name, characters should be replaced by number combination which is bothersome to operate). Furthermore, since a telephone set is usually fixed at a certain location in the room, sometimes it will be inaccessible for the user to reach the information of phone number or name if he or she is far away from the telephone. Similarly, when the user obtains a new phone number or other relative information outdoors, he or she has to write it down or memorize it by any other way before further registering it to the digital telephone. Therefore, the duplicated process is quite inconvenient.

European Patent No. 0 450 550 A2 discloses a communication apparatus capable of connecting to an information media, such as an electronic notebook, an IC card or the like. The apparatus is a telephone exchange device which can link itself in a common ISDN (Integrated Services Digital Networks) or an analog network through an office line interface card, and connect to some extension phones through extension interface cards, providing functions of identifying telephone calls, storing messages, exchanging information with some specific extension phones or storage media installed to the extension phones, and speed dialing.

Further, European Patent No. 0 452 629 A2 discloses a telephone apparatus similar to the previously mentioned apparatus of European Patent No. 0 450 550 A2. It is still a telephone exchange apparatus working with extension telephones and provides a function of reception control in accordance with an input schedule.

Though the apparatuses of prior arts as disclosed in the aforesaid patents provide functions of storing information on media (such as electronic notebook, IC card or the like), performing data exchange, speed dialing and schedule control, they all require a specific telephone exchange apparatus connecting them to extension telephones. In other words, users cannot use those information storage media (electronic notebook, IC card or the like) directly on a common digital telephone, and a common digital telephone cannot perform the aforesaid functions by itself.

SUMMARY OF THE INVENTION

It is therefore a primary object of the present invention to provide an extension device capable of working with a common digital telephone and providing a function of easy text input.

According to the present invention, a telephone extension device includes a data exchange unit which will communicate directly with a digital telephone for data communications without using a specific telephone exchange apparatus, and an electric note card which includes a standard computer keyboard for easy and fast character input when it connects via the data exchange unit with a digital telephone.

It is another object of the present invention to provide a telephone extension device capable of connecting to a digital telephone and providing functions of information carrying, data exchange, storage and editing.

To achieve the aforesaid object, the present invention provides an electric note card which will perform information storage, editing and inquiry like a portable data bank, and data exchange with a digital telephone when it connects via a data exchange unit to the digital telephone. Therefore, the invention extends the functions of telephone and easily handles the data of the same.

Furthermore electric note card of the present invention also includes a display unit such as a liquid crystal display for showing information facilitating the users to read and operate.

The features and advantages of present invention will be apparent from the detailed description of following preferred embodiments with the accompanying drawings.

DETAILED DESCRIPTION OF PREFERRED EMBODIMENTS

Figure 1:
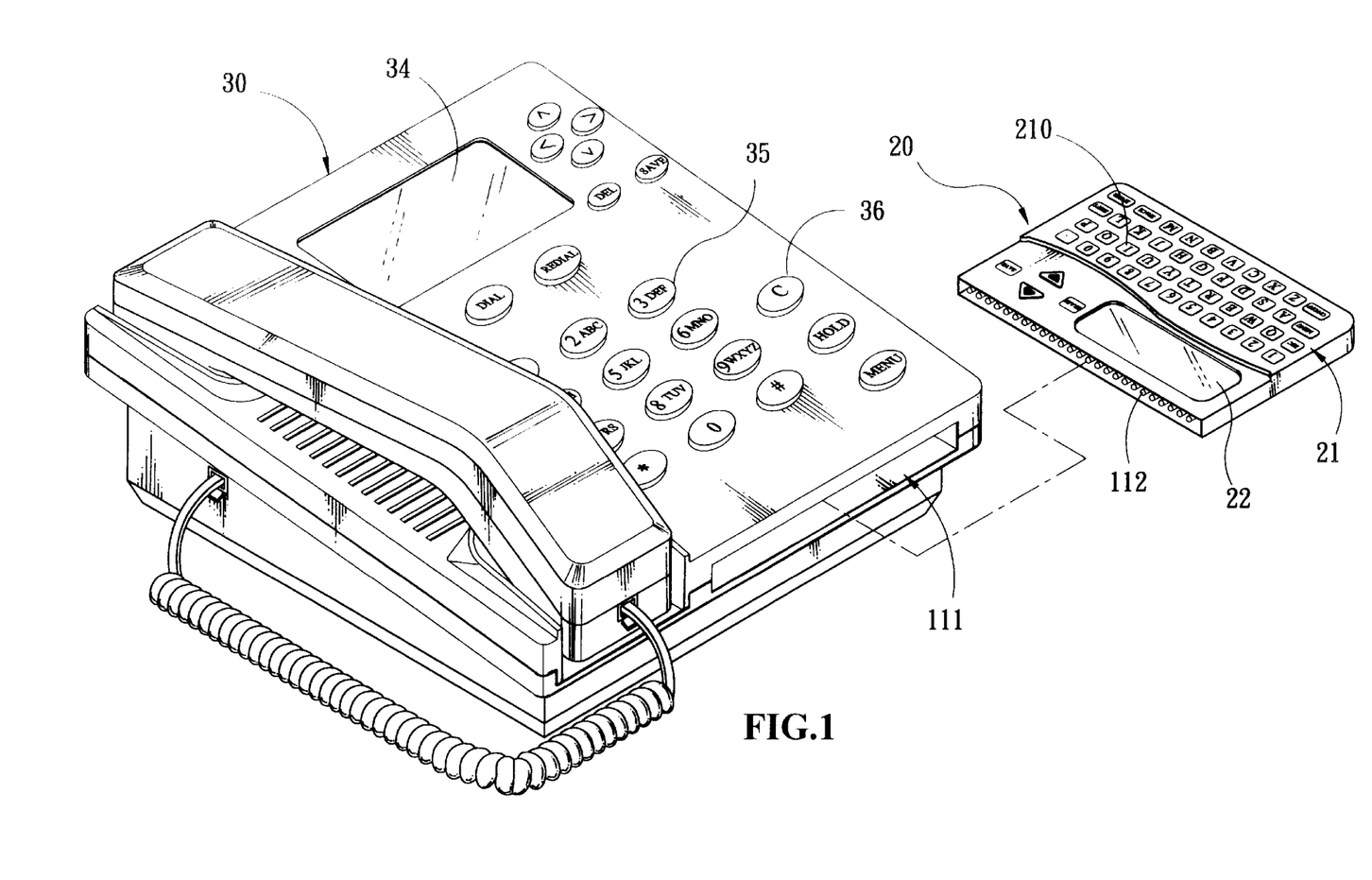
FIG. 1 is a perspective view showing an extension device as a first embodiment of the present invention to be connected to a digital telephone.

As shown in FIG. 1, an extension device for working with a digital telephone 30 includes a data exchange unit 10 which is installed in the telephone (not shown in the drawing), and an electric note card 20 which is similar to a PDA (Personal Digital Assistant). The electric note card 20 is capable of connecting via the data exchange unit 10 to the digital telephone 30 for data communications, such as storing information from the telephone 30, or uploading data from the note card 20 to the telephone 30 according to commands from the telephone. Also, the electric note card 20 includes a standard computer keyboard 21, and a display unit 22 (such as a LCD or the like) for display of information stored in the electric note card 20 or in the digital telephone 30, expediting users' reading and operation. Remarkably, the keyboard 21 includes full numerical and character keys 210 which make easier the text input, data exchange, storage and editing in a common digital telephone incorporated with the data exchange unit 10. Therefore, the present invention provides an extension unit for digital telephone, which is not only easy for data inputting and carrying as an electronic notebook but also to be operated.

Figure 2:
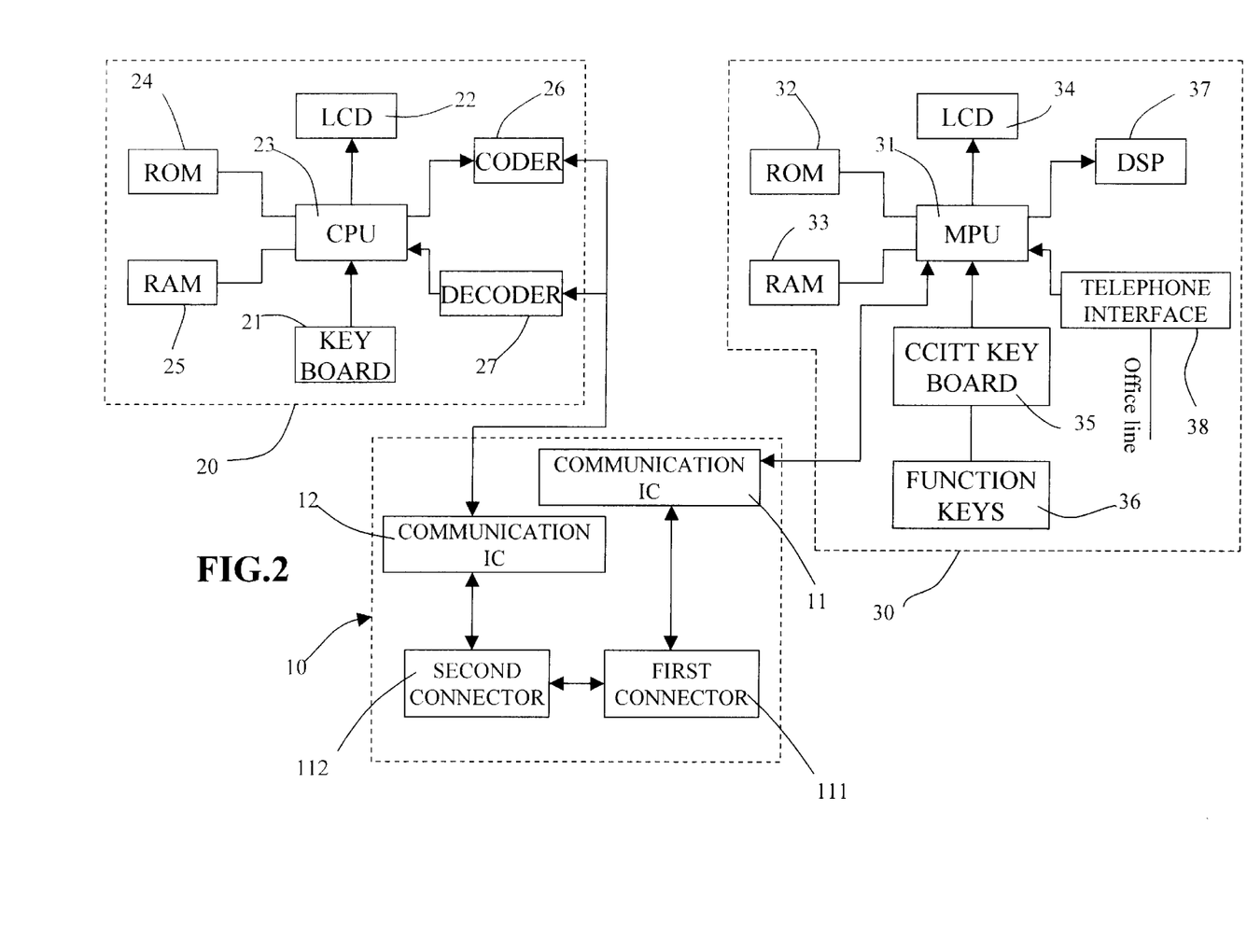
FIG. 2 is a systematic block diagram showing the connection of an extension device to a digital telephone.

As shown in FIG. 2, the electric note card 20 includes a central processing unit (CPU) 23, a read only memory (ROM) 24, a random access memory (RAM) 24, a display unit 22 such as LCD, a keyboard 21, a coder 26 for processing output data, and a decoder 27 for processing received data. Information data in the electric note card 20, such as operation program or any received data, are stored in the ROM 24 and the RAM 25. These data are transformed between binary codes and character codes by the coder 26 and the decoder 27, displayed on the display unit 22 as visible information, and transmitted or received under the control of CPU 23.

The data exchange unit 10 includes a first and a second communication IC 11 and 12 controlled respectively by the digital telephone 30 and the electric note card 20; there is also a first and a second connector 111 and 112 connected to the IC 11 and IC 12 respectively. Furthermore, in a practical embodiment, the first connector 111 is installed in the digital telephone 30, and the second connector 112 is installed in the electric note card 20. Therefore, by the connection through first and the second connectors 111 and 112, the electric note card 20 and the digital telephone can communicate with each other and exchange data.

A digital telephone 30 generally includes a microprocessing unit (MPU) 31, a read only memory (ROM) 32 and a random access memory (RAM) 33 for storing or retrieving information data, a liquid crystal display (LCD) 34, a CCITT keyboard 35, several function keys 36 for executing specific functions such as inquiry, output or download, a digital signal processing (DSP) module 37, and a telephone interface 38 which includes circuits of telephone control, dialing and voice transmission.

The first and second communication IC 11 and 12 are controlled respectively by the MPU 31 and the CPU 23 for building up communication path between the electric note card 20 and the digital telephone 30. For the manner of installation, the first communications IC 11 can be directly incorporated with the telephone 30 or built into the MPU 31; the second communications IC 12 can be directly incorporated with the electric note card 20 or built into the CPU 23.

Figure 8:
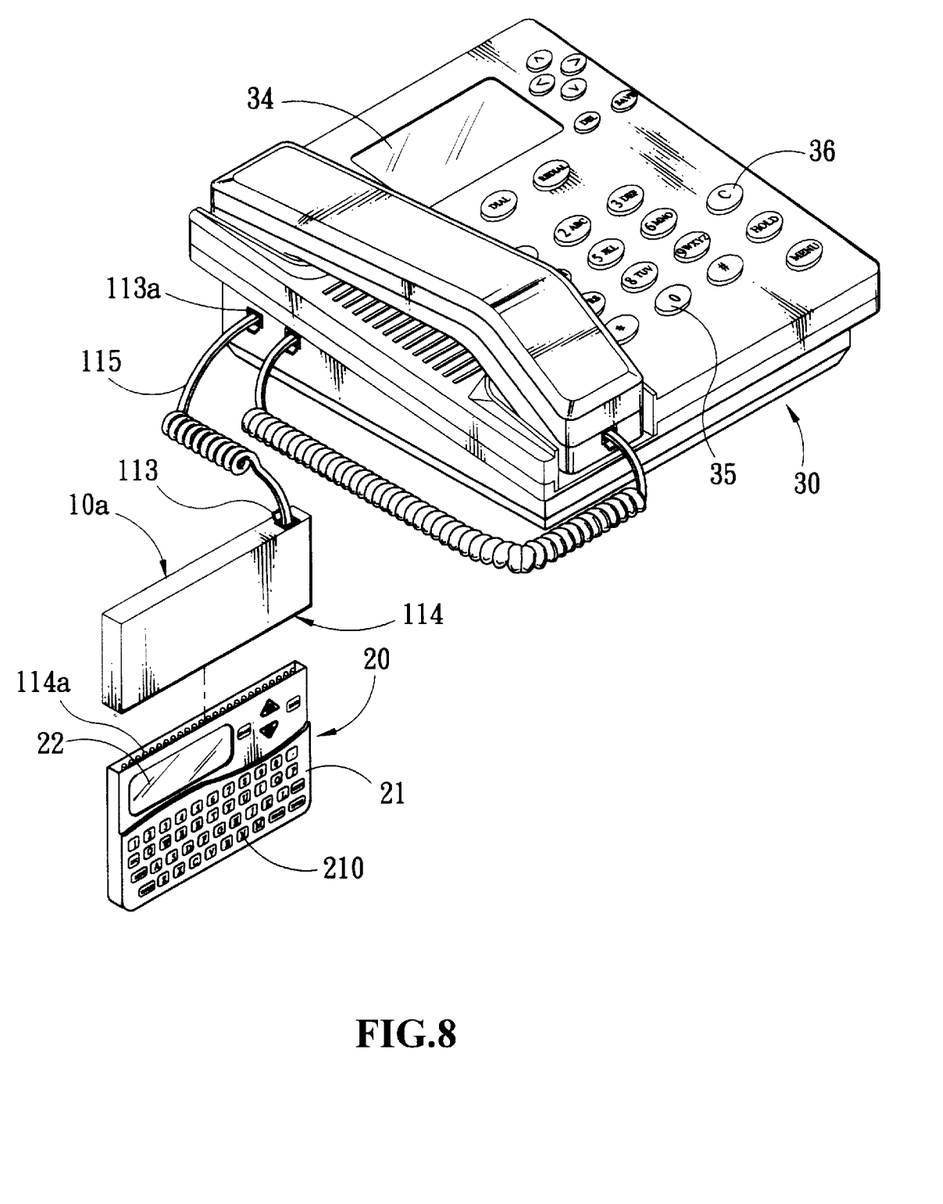
FIG. 8 is a perspective view showing a second embodiment of the present invention in which a data exchange unit is separated from a digital telephone and an electric note card.

Another installation manner is to separate the data exchange unit 10 as a sole module 10a shown in FIG. 8. In this manner, the first and second communication IC 11 and 12 in the data exchange unit 10a are connected via internal circuit such as printed circuit, then externally connected to the digital telephone 30 and the electric note card 20 through connectors 113, 113a, 114, and 114a furnished on their corresponding sides respectively. For the purpose of convenience, as shown in FIG. 8, the connector 113 can be extended with a communication cable 115 while the connector 114 is an adapter for the electric note card 20 to mount with.

In the embodiment of FIG. 8, users can even exchange data of the electric note card with other compatible digital telephones, easily utilizing the data bank of the electric note card, and increasing the efficiency and convenience of the operation.

Figure 3A:
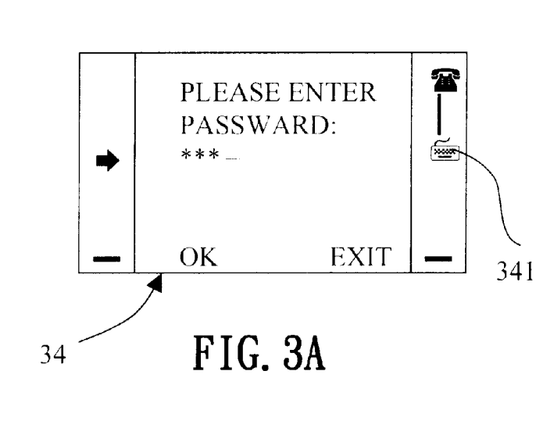
FIGS. 3A to 3E are examples of display shown on a digital telephone during the connection to an electric note card.
Figure 3B:
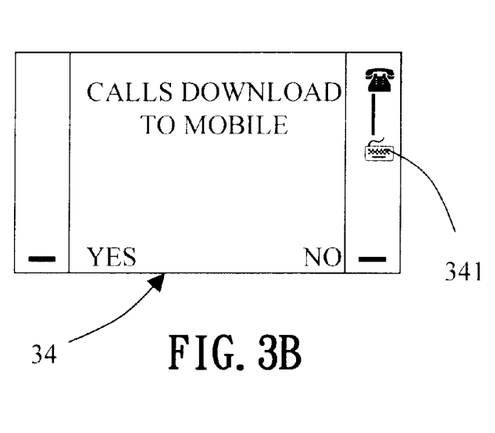
Figure 3C:
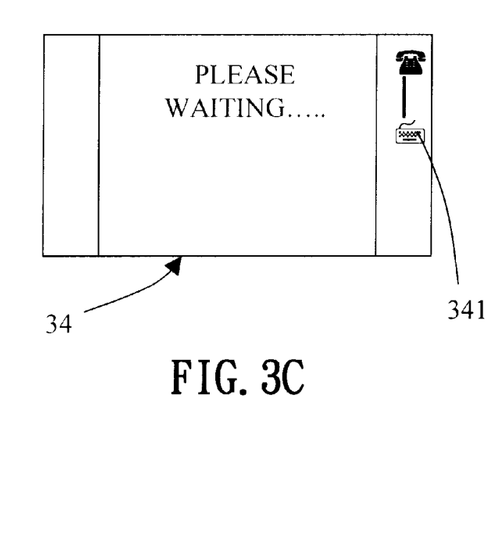
Figure 3D:
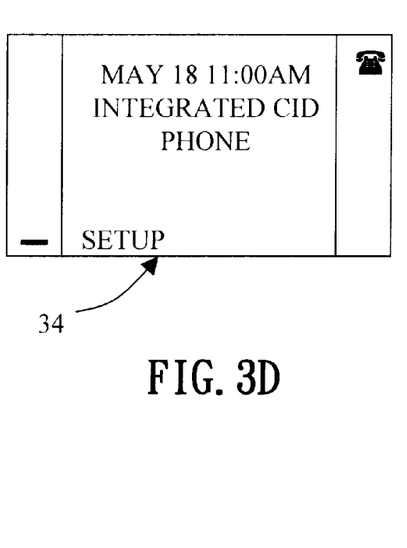
Figure 3E:
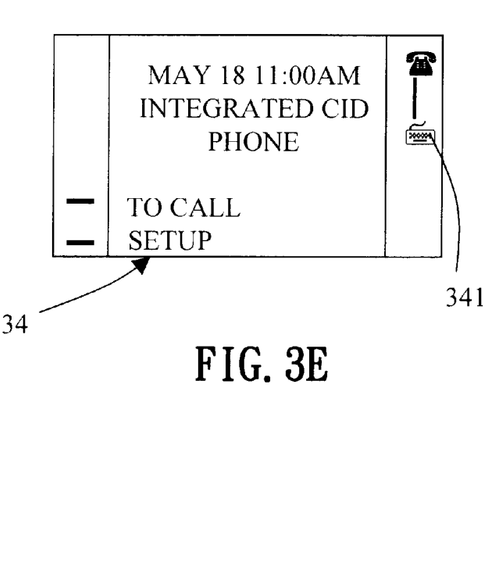

FIG. 3A to FIG. 3E are examples of display 34 (referring to FIG. 2) shown on a digital telephone 30 during the connection to an electric note card 20. When the electric note card 20 is correctly connected to a digital telephone 30 via the data exchange unit 10, the electric note card 20 will share the LCD 34 of the digital telephone, i.e., the operation information or the data will all be displayed on the LCD 34. As shown in FIG. 3A, the digital telephone 30 first will detect the electric note card 20, then display a dialog frame asking the user for password. After a correct password is entered, a dialog asking whether to download any calls information to the electric note card 10, as shown in FIG. 3B, is displayed. The user can choose "YES" or "NO." If the answer is "YES," the display will change to a frame as the one in FIG. 3C and the call information is duplicated to the electric note card 20; if the answer is "NO," the call information will only be stored in the digital telephone 30. After the duplication, an initial frame as the one in FIG. 3E is displayed, which indicates that an electric note cards correctly mounted to the digital telephone. Otherwise, if the digital phone 30 is free from connection or disconnecting from an electric note card, an initial frame as the one shown in FIG. 3D is displayed. By the comparison of two frames in FIG. 3D and 3E that if an icon 341 of electric note card is displayed or not, the user can easily judges that the electric note card 20 is correctly connected to the digital telephone 30 or not.

It is obvious that the aforesaid frames of display are only depicted as examples of the embodiments. The icon 341 can be selectively provided for indicating the electric note card is connected or not. They are not to limit any possible modifications in other embodiments.

Figure 4:
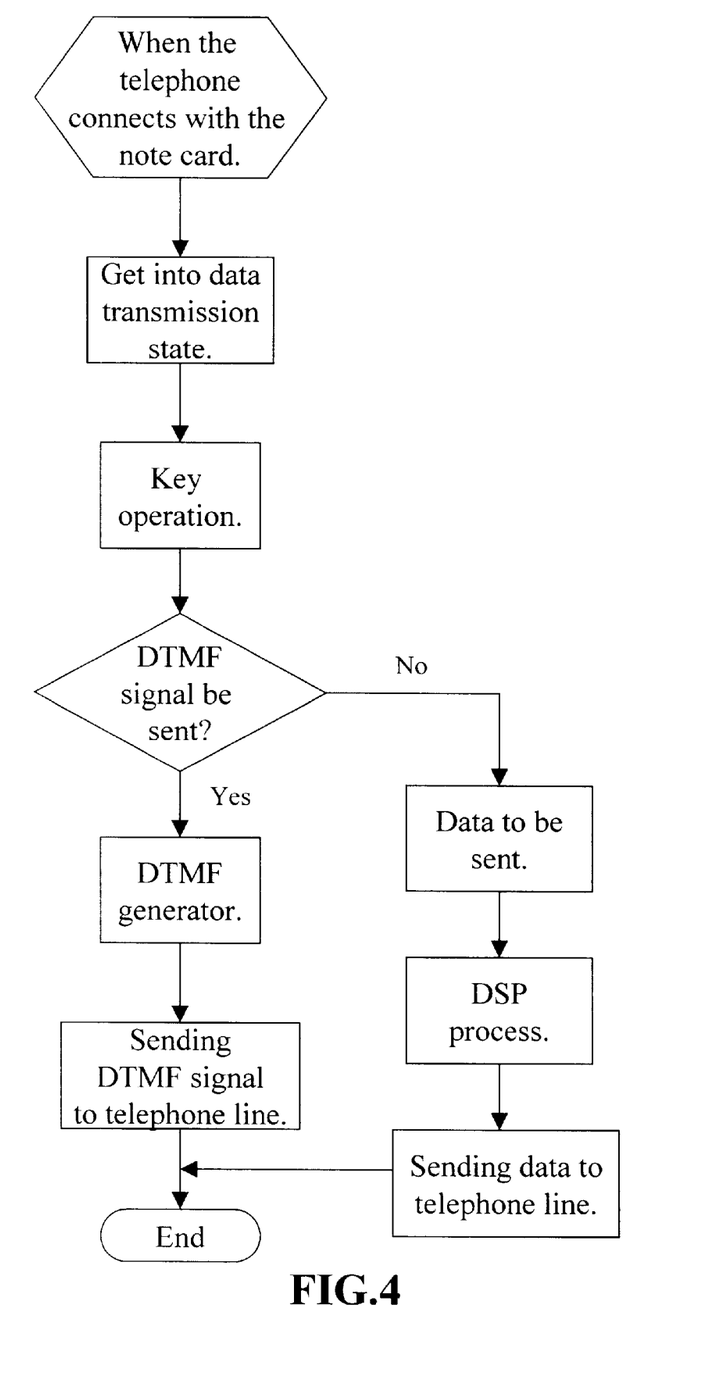
FIG. 4 is a flowchart showing the process of information transmission of a device according to the present invention.

The functional process of dialing, data exchanging or editing will be described below:

FIG. 4 is a flowchart showing the process of information transmission. When the user selects a dialing function by operating keys on the digital telephone 30, the circuit of telephone will determine whether a DTMF signal should be sent (when the user dials through the CCITT keyboard 35 of telephone for example). If the answer is yes, the circuit will transmit DTMF signals to the telephone lines corresponding to the dialed number. Otherwise, if the user chooses a specific number from the data bank, the circuit will then transform the number by DSP (digital signals processing) unit into signals of dialing. By the same method, the dialing may also be implemented by operating a speed-dial or re-dial key of the digital telephone.

Figure 5:
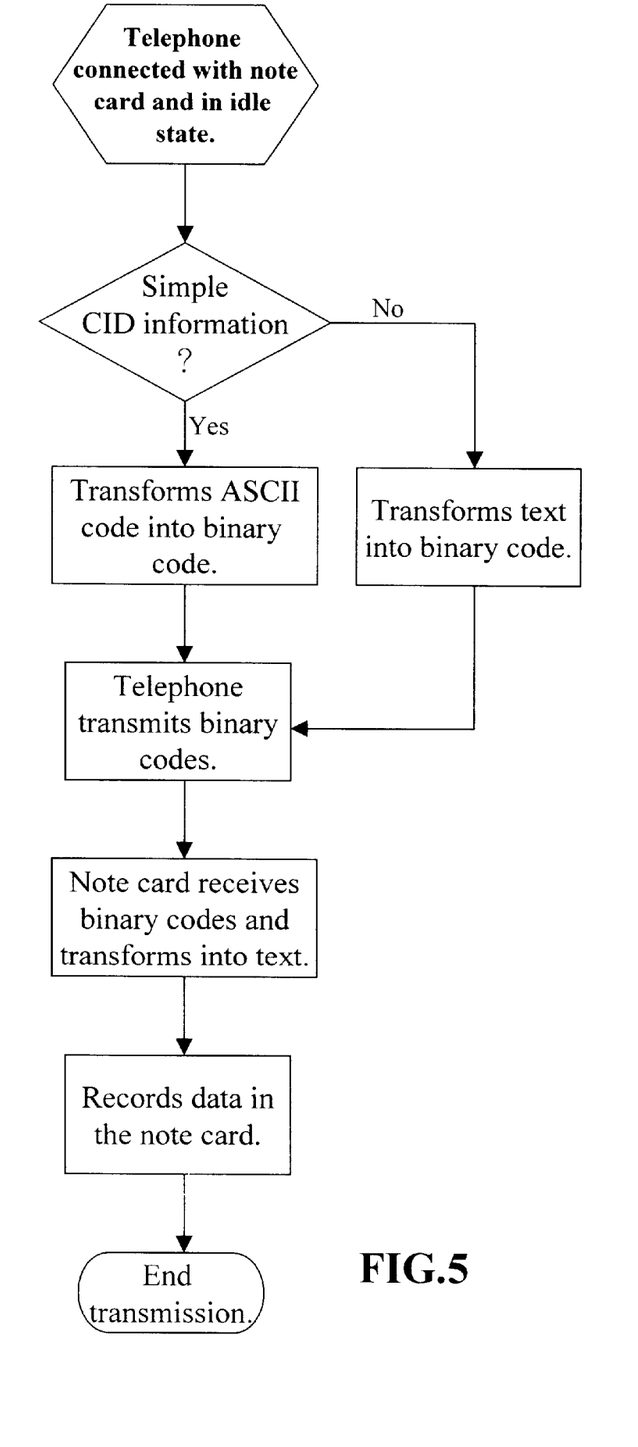
FIG. 5 is a flowchart showing the processing process of data exchange between an electric note card and a digital telephone.

FIG. 5 is a flowchart showing the process of data exchange between an electric note card 20 and a digital telephone 30. After the electric note card connects to the digital telephone, when there is an incoming call, the circuit in the digital telephone 30 will determine whether the call is a simple CID (caller ID, i.e., the caller's number is contained) information or not. If the answer is yes, the telephone 30 will transform the ASCII code into a binary code and display the number on the LCD 34. Otherwise, when the call contains text message or data, the telephone 30 will transform the information into binary codes, display it on the LCD 34, and provide the binary codes an output passing through the first communications IC 11, the first connector 111, the second connector 112 and the second communications IC 12 to the electric note card 20, then further transform the binary codes into characters or data, and record them into the electric note card 20. By the same way, data transmission from the electric note card 20 to the digital telephone 30 can be achieved in a reverse path.

Therefore, when the electric note card 20 is used individually, it works like an electronic telephone notebook which contains telephone numbers and information downloaded from the digital telephone 30 for an easier reference. Moreover, when the user hopes to input a text or data information to the digital telephone, he or she may easily use the full character keyboard 210 of the electric note card 20 to accomplish the text input, then connect the electric note card 20 to the digital telephone 30 for sharing or transmitting information to the telephone so as to resolve the difficulties of text input on the digital telephone.

Evidently, when the electric note card 20 is used individually, it is an electronic notebook for the user to register telephone numbers or data as its basic function. The records are so easily made without using the pen and paper, and retrieved by an inquiry function of the electric note card 20.

Figure 6:
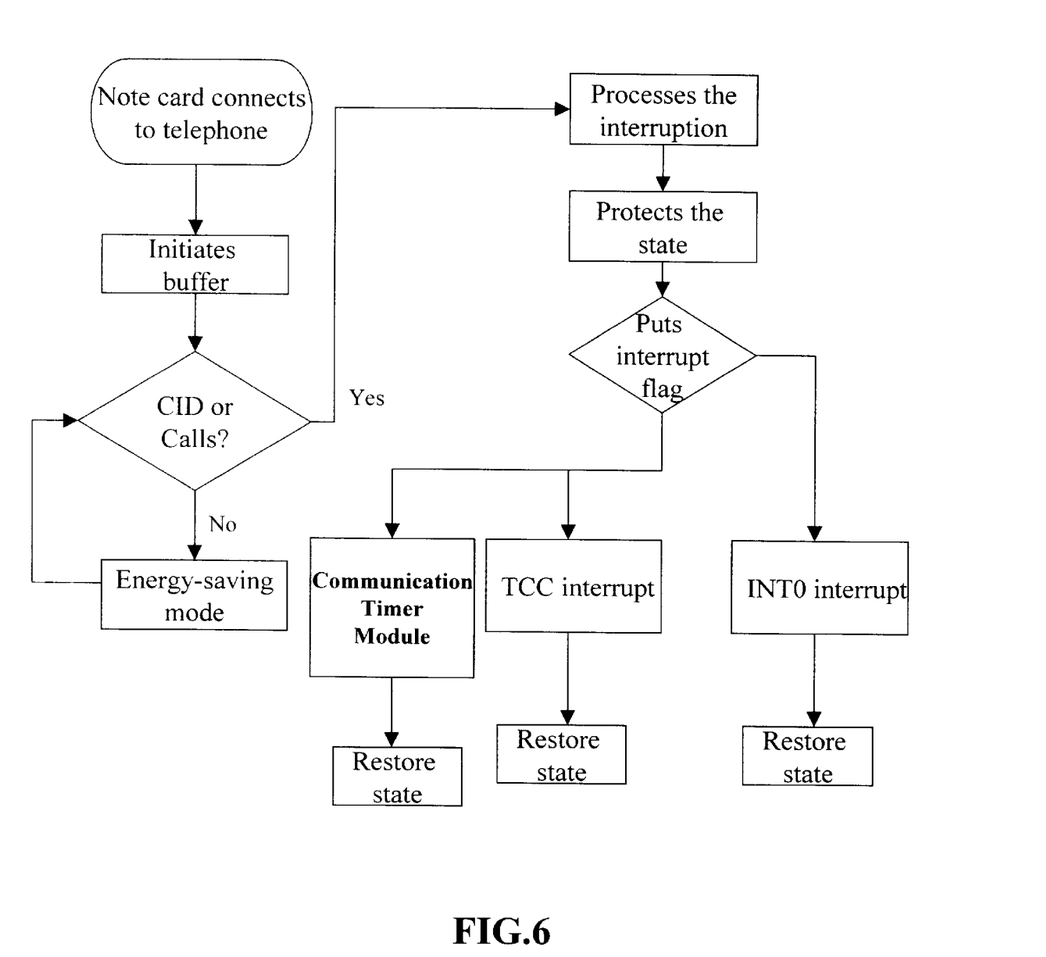
FIG. 6 is a flowchart showing the processing procedure of a digital telephone responding to data inputs.
Figure 7A:
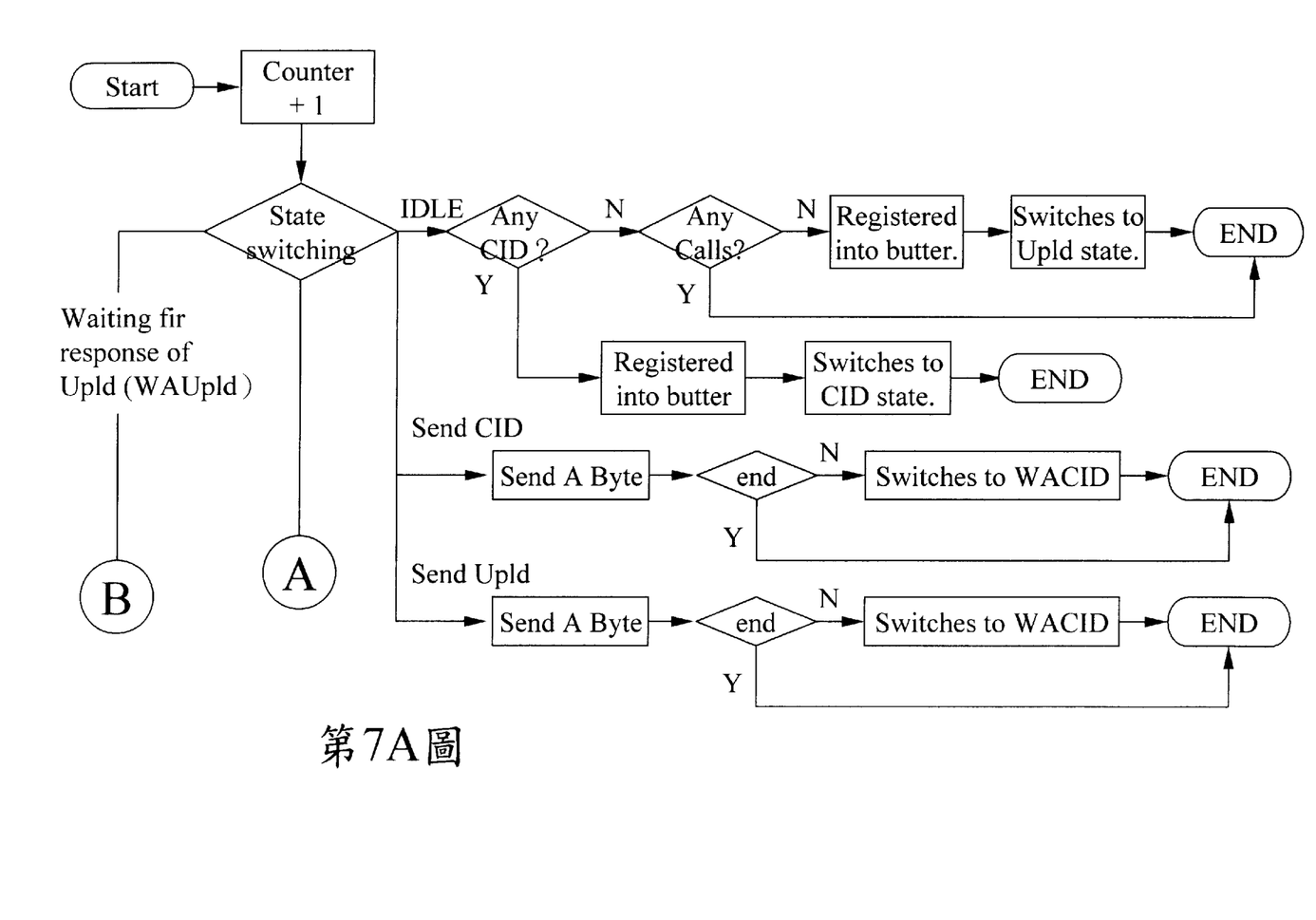
FIG. 7 is a flowchart showing the processing procedure of a communication module in FIG. 6.
Figure 7B:
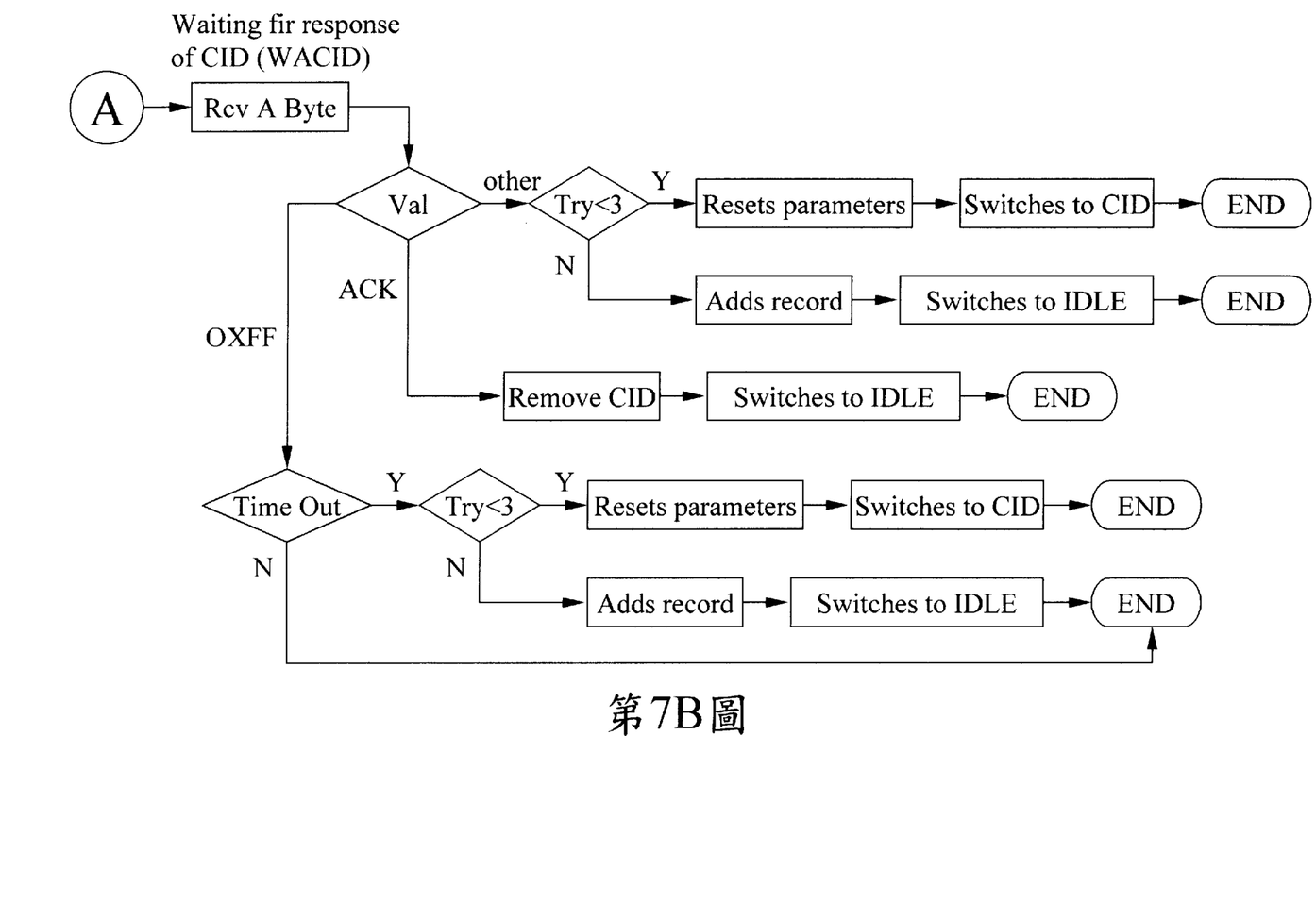
Figure 7C:
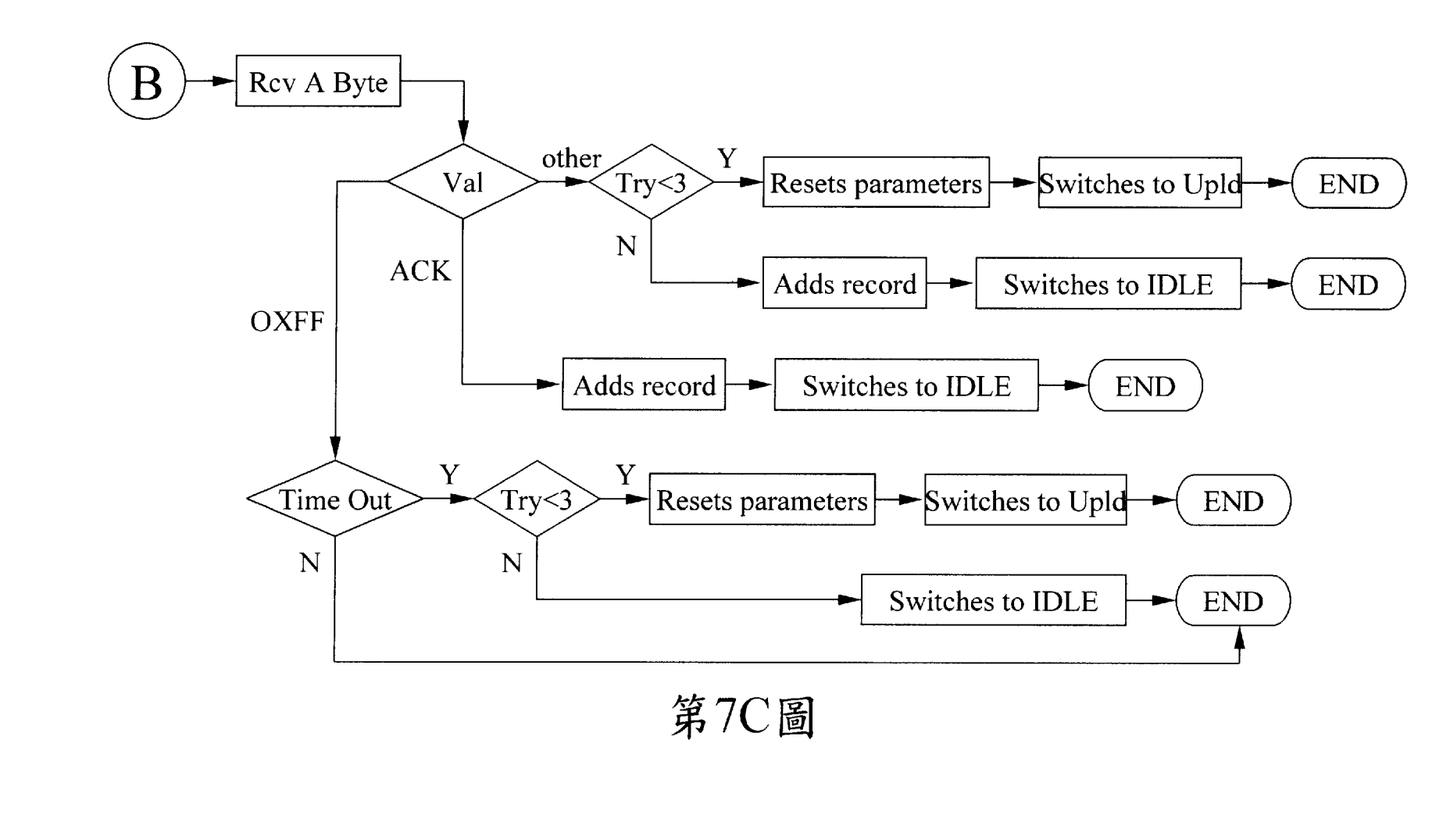

The embodiments of communication procedures between the electric note card 20 and the digital telephone 30 will be further described in accompany with FIG. 6 and FIG. 7.

FIG. 6 is a flowchart showing the processing procedure of a digital telephone 30 responding to data inputs from an electric note card 20. In the embodiment, the CPU 23 and the MPU 31 are 4-bit processors. The programs are designed by using the instruction sets provided by manufacturer of the processor and the most frequent used instructions are the interruptions TTC, INTO, and so on. Generally, the time of message transmission and reception is set up by a Timer and by inspecting if the time is out or not, it can check if the communications between electric note card 20 and digital telephone 30 are successful or not. As shown in FIG. 6, the procedure first initiates the buffer, checking if there is any coming call. If the answer is no, the "energy-saving" mode is activated; if yes, the Timer is cleaned, the interruption is processed, the state is wrapped, the interrupt flag is put, and different procedures continue according to the characteristics of the coming call, such as Communication Timer Module, TCC interrupt, or INTO interrupt. After the procedures, the state is unwrapped.

The most frequent used procedure in the embodiment is the Communication Timer Module as illustrated in FIG. 7. Firstly, the counter is increased with one increment, then the communication states are checked, in which the states include IDLE (free), Send CID (transmitting caller ID information), Send Upld (transmitting data to the electric note card), WACID (waiting response after Send CID), and WAUpld (waiting response after Send Upld).

In the IDLE state, the telephone 30 checks if there is any CID information coming. If the answer is no, it checks if there is any calls coming; if yes, it puts the call information in the buffer (Send BUF), and switches to the state of Send Upld for transmitting data to the electric note card. If there is no call, it returns to IDLE. If there is CID information coming, it puts the CID information in the buffer (Send BUF), switches to the state of Send CID for transmitting caller ID information, and returns.

In the Send CID state, the telephone transmits the data in the buffer (Send BUF), then goes to the WACID state for waiting a response to make sure if the communication succeed or not.

In the WACID state, the telephone checks a response value to determine if the CID transmission succeeds or not. In the embodiment of protocol, a return value ACK (ASCII code 06) means success. If so, the CID data in the buffer are cleared, and then the system returns to IDLE. If an OXFF value returns, that means data transmission failed (Time Out), and the CID data will be resent for three times (controlled by the TIMER with suitable intervals). If they still fail, the transmission will then be canceled and the system returns to IDLE. Any other return value except the ACK will activate the three time resending function.

In the WAUpld (waiting response after transmitting data to the electric note card 20), the telephone also waits for a response value to determine if the Send Upld transmission succeeds or not. In the embodiment of protocol, a same return value ACK (ASCII code 06) means success. If so, the data in the buffer are cleared, and then the system returns to IDLE. If an OXFF value returns, that means that the data transmission failed (Time Out), and the uploading data will be resent for three times (controlled by the TIMER with suitable intervals). If they still fail, the transmission will then be canceled and the system returns to IDLE. Any other return value except the ACK will activate the three time resending function.

In the practical embodiments of transmission, both of parallel or serial manner can be used. For an asynchronous serial interface, an universal asynchronous receiver/transmitter (UART) can be used. Practically, two standard 25-pin RS232 serial interfaces can be used for the first and second connector 111 and 112; two UART chips can be used for the first and the second communication IC 11 and 12.

The advantages of an extension device for digital telephone according the present invention are:

1) Capable of easy text input for a common digital telephone. Since the extension device is equipped with a full character keyboard, it is easy and efficient for text or character input;

2) Capable of applying to a common digital telephone instead of a specific telephone exchange apparatus. Since a data exchange unit is provided in the digital telephone, the electric note card can easily communicate with any compatible digital telephone that is equipped with the data exchange unit for providing functions of data exchange, storage and editing;

3) Easy to carry and register telephone number or related information. Since the electric note card is portable, it is easy to carry and useful for recording telephone numbers or data, and even for reviewing calls information downloaded from the digital telephone; and 4) Capable of communicating with compatible telephones so as to utilize the information stored in the electric note card and enhance the efficiency and convenience of telephone operation.

Although the invention has been described in connection with preferred embodiments, it will be understood by those skilled in the art that various changes may be made without departing from its scope.

I claim:

1. An extension device capable of connecting to a digital telephone for providing functions of fast text input, data carrying, exchanging, storing and editing, comprising:

an electric note card having a display unit for showing data and information and a full characters keyboard for data inputs, the electric note card being provided for receiving and recording information provided by the digital telephone, and uploading information to the digital telephone under commands from the telephone; and a data exchange unit, mounted between the digital telephone and the electric note card, for providing a communications path therebetween;

wherein the data exchange unit comprises:

a first communication IC controlled by the digital telephone for data communication;

a second communication IC controlled by the electric note card for data communication; and a first and a second connectors for linking to each other, connecting respectively to the first and the second communication ICs, and therefore providing a communication path between the digital telephone and the electric note card.

2. An extension device for a digital telephone according to claim 1 wherein the electric note card is a Personal DigitalAssistant.

3. An extension device for a digital telephone according to claim 1 wherein the electric note card comprises:

a central processing unit for executing, receiving, and transmitting data;

a read only memory;

a random access memory for registering and recalling data;

a display unit for displaying data and information;

a keyboard, which comprises character keys, for text input;

a coder to process data for transmission; and a decoder to process data after receiving.

4. An extension device for a digital telephone according to claim 3 wherein the display unit is a liquid crystal display.

5. An extension device for a digital telephone according to claim 1 wherein the first and the second communication ICs are of universal asynchronous receiver/transmitter.

6. An extension device for a digital telephone according to claim 1 wherein the first communication IC is mounted in the digital telephone and the second communication IC is mounted in the electric note card.

7. A data exchange unit according to claim 1 wherein the first and the second communication ICs, and the first and the second connectors are all integrated as an unit.

8. Data exchange unit according to claim 7 wherein the first and the second communication IC are of universal asynchronous receiver/transmitter.

9. An extension device capable of connecting to a digital telephone for providing functions of fast text input, data carrying, exchanging, storing and editing, comprising:

an electric note card having a display unit for showing data and information and a full characters keyboard for data input, the electric note card being provided for receiving and recording information provided by the digital telephone, and uploading information to the digital telephone under commands from the telephone; and a data exchange unit, mounted between the digital telephone and the electric note card, for providing a communications path therebetween;

wherein the electric note card comprises:

a central processing unit for executing, receiving and transmitting data;

a read only memory;

a random access memory for registering and recalling data;

a display unit for displaying data and information;

a keyboard, which comprises character keys, for text input;

a coder to process data for transmission; and a decoder to process data after receiving;

and the data exchange unit comprises:

a first communication IC controlled by the digital telephone for data communication;

a second communication IC controlled by the electric note card for data communication; and a first and a second connectors for linking to each other, connecting respectively to the first and the second communication ICs, and therefore providing a communication path between the digital telephone and the electric note card.

* * * * *